US00RE46091E

(19) United States
(12) Reissued Patent
Won et al.

(10) Patent Number: US RE46,091 E
(45) Date of Reissued Patent: Aug. 2, 2016

(54) OIL LEVEL DETECTING DEVICE FOR A COMPRESSOR AND AN AIR CONDITIONING SYSTEM HAVING THE SAME

(71) Applicant: LG ELECTRONICS INC., Seoul (KR)

(72) Inventors: Inho Won, Seoul (KR); Seheon Choi, Seoul (KR); Byeongchul Lee, Seoul (KR)

(73) Assignee: LG ELECTRONICS INC., Seoul (KR)

(21) Appl. No.: 14/711,163

(22) Filed: May 13, 2015

Related U.S. Patent Documents

Reissue of:
(64) Patent No.: 8,733,116
Issued: May 27, 2014
Appl. No.: 12/958,874
Filed: Dec. 2, 2010

(30) Foreign Application Priority Data

Apr. 1, 2010 (KR) ..... 10-2010-0030122

(51) Int. Cl.
*F25B 31/00* (2006.01)
*F25B 43/02* (2006.01)
(Continued)

(52) U.S. Cl.
CPC ..... *F04B 39/0207* (2013.01); *F04B 39/023* (2013.01); *F04C 23/008* (2013.01);
(Continued)

(58) Field of Classification Search
CPC .... F04B 39/0207; F04B 39/023; F04C 29/02; F04C 23/008; F04C 18/0215; F04C 2270/86; F04C 2240/81; F04C 2270/24
See application file for complete search history.

(56) References Cited

U.S. PATENT DOCUMENTS 4,478,050 A 10/1984 DiCarlo et al.
4,490,988 A * 1/1985 Vogel et al. ..... 62/193
(Continued)

FOREIGN PATENT DOCUMENTS

CN 1188218 7/1998
CN 1690603 A 11/2005
(Continued)

OTHER PUBLICATIONS

United States Office Action dated Mar. 7, 2013 issued in U.S. Appl. No. 12/958,915.
(Continued)

*Primary Examiner* — Joseph Kaufman
(74) *Attorney, Agent, or Firm* — KED & Associates, LLP

(57) ABSTRACT

An oil level detecting device for a compressor and an air conditioning system having the same are provided. The oil level detecting device may be provided in a compressor including a compression device that introduces and compresses a working fluid, a driving device mechanically connected to the compression device that operates the compression device, and a case that accommodates the compression device and the driving device thereinside and having an oil storage space that stores oil at a lower portion thereof. The oil level detecting device may include a detector including a supporting portion configured to be attached to the case and a detecting portion that protrudes inside the case. At least one property of the detecting portion may vary according to an oil level inside the case. The oil level detecting device may also include a signal processor including an electronic element having at least one reference property. The signal processor may compare the at least one property of the detecting portion with the at least one reference property of the electronic element and outputs a control signal according to the result.

34 Claims, 4 Drawing Sheets

(51) Int. Cl.

| | |
|---|---|
| ***F04B 39/02*** | (2006.01) |
| ***F04C 29/02*** | (2006.01) |
| ***F04C 23/00*** | (2006.01) |
| *F04C 18/02* | (2006.01) |

(52) U.S. Cl.
CPC ..... *F04C 29/02* (2013.01); *F04C 18/0215* (2013.01); *F04C 2240/81* (2013.01); *F04C 2270/24* (2013.01); *F04C 2270/86* (2013.01)

(56) References Cited

U.S. PATENT DOCUMENTS

| | | | | |
|---|---|---|---|---|
| 4,589,263 | A | 5/1986 | DiCarlo et al. | |
| 4,870,831 | A | 10/1989 | Kitamoto | |
| 5,094,598 | A | 3/1992 | Amata et al. | |
| 5,245,837 | A | 9/1993 | Kitamoto | |
| 5,321,956 | A | 6/1994 | Kemp et al. | |
| 5,327,997 | A | 7/1994 | Nash et al. | |
| 5,911,289 | A | 6/1999 | Waller | |
| 5,996,363 | A | 12/1999 | Kurachi et al. | |
| 6,941,767 | B2 | 9/2005 | Matsuoka et al. | |
| 6,948,335 | B2 | 9/2005 | Matsuoka | |
| 6,986,259 | B2 | 1/2006 | Takegami et al. | |
| 7,007,503 | B2 | 3/2006 | Takashi | |
| 7,222,491 | B2 | 5/2007 | Moriwaki | |
| 7,231,783 | B2 | 6/2007 | Esslinger et al. | |
| 8,028,539 | B2 | 10/2011 | Yoon et al. | |
| 8,365,594 | B2 * | 2/2013 | Sabini et al. | 73/304 C |
| 8,733,116 | B2 | 5/2014 | Won et al. | |
| 2004/0184931 | A1 * | 9/2004 | Millet et al. | 417/298 |
| 2007/0163840 | A1 | 7/2007 | Sekiya et al. | |
| 2008/0087028 | A1 | 4/2008 | Kim et al. | |
| 2008/0209924 | A1 | 9/2008 | Yoon et al. | |
| 2009/0063060 | A1 * | 3/2009 | Sun | 702/52 |
| 2009/0107170 | A1 | 4/2009 | Yoon et al. | |
| 2009/0107173 | A1 | 4/2009 | Yoon et al. | |

FOREIGN PATENT DOCUMENTS

| | | | | |
|---|---|---|---|---|
| CN | 1776330 | A | | 5/2006 |
| CN | 101382534 | | | 3/2009 |
| CN | 101382534 | A | | 3/2009 |
| CN | 100570224 | C | | 12/2009 |
| CN | 201382799 | | | 1/2010 |
| CN | 201382799 | Y | | 1/2010 |
| JP | 55-137382 | A | | 10/1980 |
| JP | 05-172074 | A | | 7/1993 |
| JP | H07317524 | A | | 12/1995 |
| JP | 09-113746 | A | | 5/1997 |
| JP | 09113476 | A | * | 5/1997 |
| KR | 10-1999-0024322 | A | | 4/1999 |
| KR | 10-1999002432 | A | | 4/1999 |
| KR | 10-20090071085 | A | | 7/2009 |
| WO | WO 2008/044807 | A2 | | 4/2008 |
| WO | WO 2009/054571 | A1 | | 4/2009 |

OTHER PUBLICATIONS

Chinese Office Action dated May 30, 2013 issued in Application No. 201010546684.7.

Korean Office Action dated Jan. 28, 2014 issued in Application No. 10-2010-0030122.

Chinese Office Action dated Mar. 14, 2016 issued in Application No. 201410682402.4 (with English translation).

Chinese Office Action dated Feb. 17, 2013.

U.S. Office Action for related U.S. Appl. No. 12/958,915 dated Mar. 7, 2013.

Chinese Office Action for Application No. 201010546684.7 dated May 30, 2013.

Korean Office Action dated Jan. 28, 2014 for corresponding Application No. 10-2010-0030122.

* cited by examiner

OIL LEVEL DETECTING DEVICE FOR A COMPRESSOR AND AN AIR CONDITIONING SYSTEM HAVING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S)

This application *is a Reissue Application of prior U.S. Pat. No. 8,733,116 issued May 27, 2014* (*U.S. patent application Ser. No. 12/958,874 filed Dec. 2, 2010*), *which* claims priority under 35 U.S.C. §119 to Korean Application No. 10-2010-0030122 filed in Korea on Apr. 1, 2010, whose entire [disclosure(s) is/are] *disclosures are* hereby incorporated by reference.

BACKGROUND

1. Field

An oil level detecting device for a compressor and an air conditioning system having the same are disclosed herein.

2. Background

Oil level detecting devices for compressors and air conditioning systems having the same are known. However, they suffer from various disadvantages.

BRIEF DESCRIPTION OF THE DRAWINGS

Embodiments will be described in detail with reference to the following drawings in which like reference numerals refer to like elements, and wherein.

DETAILED DESCRIPTION

Figure 1:
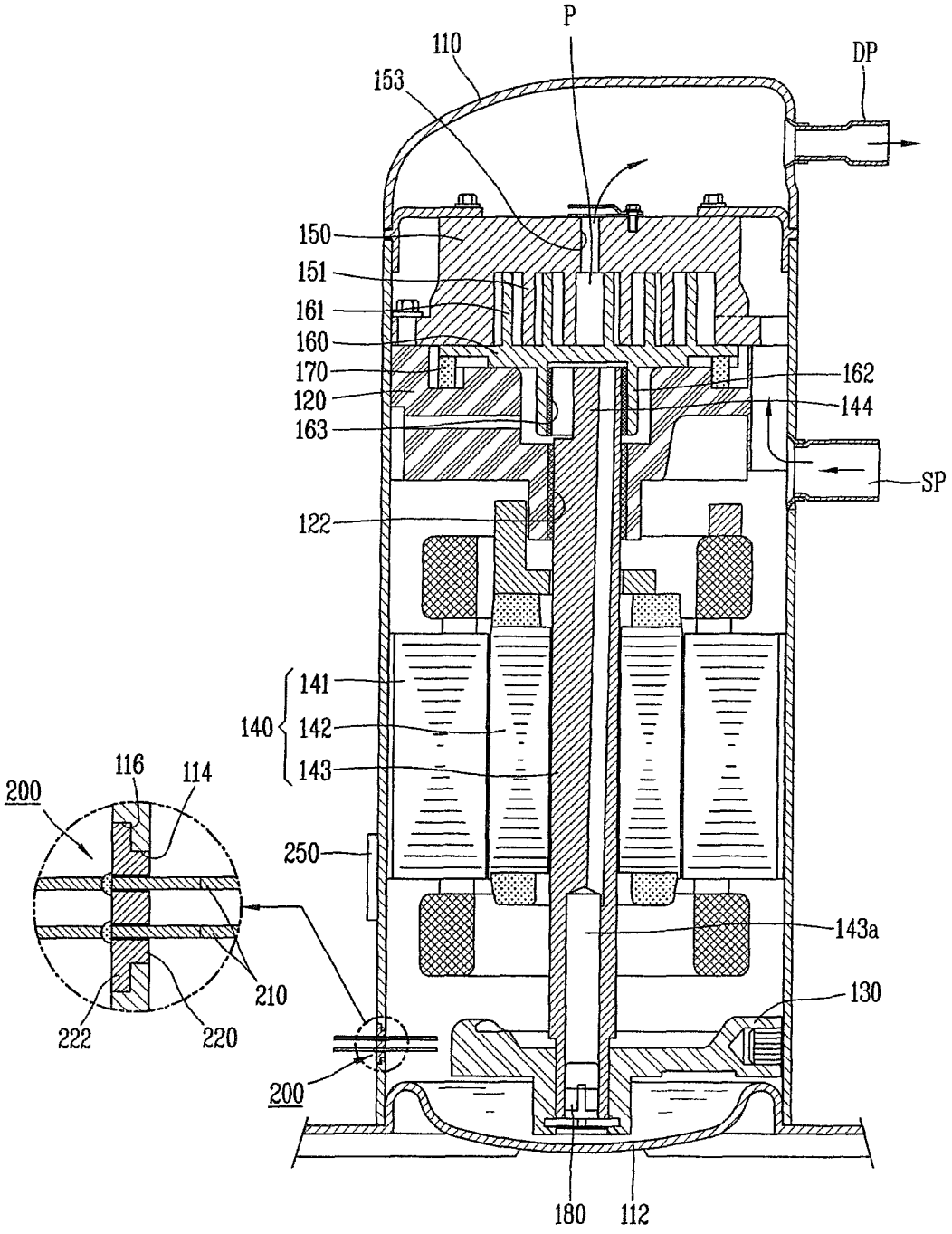
FIG. 1 is a cross-sectional view of a compressor having an oil level detecting device according to an embodiment.

A compressor, as broadly described and embodied herein, may include a drive motor that provides a driving force to a compression device to compress refrigerant while operating in conjunction with the drive motor. The compressor may be categorized as, for example, a reciprocating type, a scroll type, a rotary type, or a vibration type, depending on the method by which the refrigerant is compressed. Reciprocating type, scroll type, and rotary type compressors use a rotary motion of the drive motor, while vibration type compressors use a reciprocating motion of the drive motor.

The drive motor of a rotary type compressor may be provided with a crankshaft that transfers the rotary motion of the drive motor to the compression device. For example, the drive motor of the rotary compressor may include a stator fixed to a container or case, a rotor positioned in the stator with a predetermined gap therebetween to rotate in interaction with the stator, and a crankshaft connected to the rotor to transfer rotary power to the compression device. In addition, the compression device may be combined with the crankshaft to suction, compress, and discharge refrigerant while rotating inside a cylinder. A plurality of bearing members may be provided to form a compression space between the crank shaft and the compression device, and may also support the compression device.

In the compressor having the foregoing structure, the refrigerant may be compressed by rotating the compression device with rotary motion generated by the drive device. The compressor may be provided with an oil supply device to supply oil to the compression device that may facilitate the rotation of the compression device as well as easily dissipate heat generated during operation of the drive device. The oil supply device may be provided at a lower end portion of the crankshaft. The oil may be stored in a lower portion of the container, or case, and may be pumped through an oil flow path formed inside the crankshaft by the rotation of the crankshaft. The pumped oil may then be supplied to each component inside the compressor.

In compressors of various air conditioning systems, the oil flow path, or pipe, in which the working fluid flows may be lengthened, requiring an increased amount of oil to operate the compressor. Thus, it may be difficult to estimate when, where, and how much oil will remain, and accordingly, it may be difficult to maintain the oil level inside each compressor in an appropriate condition or level. As a result, the oil level in the oil storage space may become irregular and may vary outside of acceptable levels during operation of the respective compressor, even when the oil levels were within a suitable range at an initial stage of the operation.

Therefore, it may be necessary to continuously check the oil level inside each compressor during operation of the air conditioner. If it is determined that the oil level is not in an appropriate condition, then an oil collecting operation to add oil to the compressor may be performed. Conventionally, it is not easy to check the oil level in each compressor, and therefore, the oil collecting operation may be performed at a predetermined period of time regardless of the actual oil level. Performing the oil collecting operation irrespective of the actual oil levels may be inefficient as energy is wasted during unnecessary oil collecting operations.

To overcome this problem, an oil level sensor may be provided in the compressor to measure the oil level to determine whether an oil collecting operation is necessary. In such a system, the number of unnecessary oil collecting operations may be reduced, resulting in decreased energy consumption as well as decreased compressor downtime.

Figure 2:
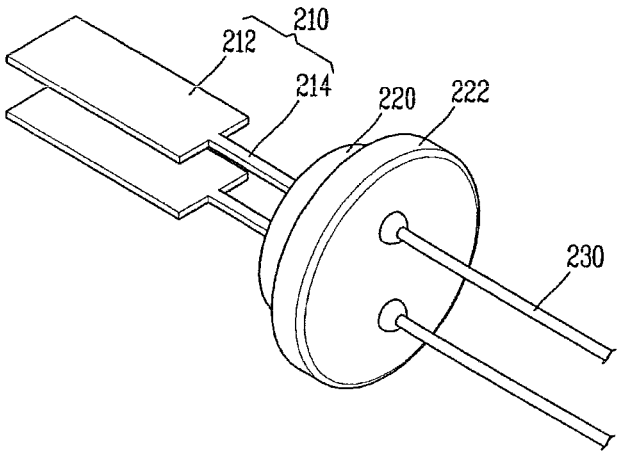
FIG. 2 is a perspective view of the oil level detecting device of FIG. 1 according to an embodiment.

FIG. 1 is a cross-sectional view of a compressor having an oil level detecting device according to an embodiment, and FIG. 2 is a perspective view of the oil level detecting device of FIG. 1 according to an embodiment. Simply for ease of explanation, this embodiment is described with reference to a scroll compressor, but the embodiments are not limited thereto. It will be apparent to those skilled in the art that the embodiments disclosed herein may be applied to any type of compressor, in particular, any type of compressor in which oil is provided at a lower end portion of a rotating shaft.

Referring to FIGS. 1 and 2, a main frame 120 and a sub-frame 130 may be provided inside a container or case 110, and a drive device 140, for example, a drive motor, may be provided between the main frame 120 and the sub-frame 130. A compression device may be provided at an upper side of the main frame 120 and combined with the drive motor 140 that compresses a working fluid, for example, a refrigerant. The compression device may include a fixed scroll 150 and an orbiting scroll 160.

The drive motor 140 may include a stator 141, which may be wound with a coil, a rotor 142 rotatably inserted in the stator 141, and a rotating shaft 143 attached to a center of the rotor 142 that that transfers rotary force to a compression mechanism. A driving pin portion 144 may be formed to protrude at an upper end of the rotating shaft 143. The driving pin portion 144 may be formed adjacent to a rotational axis of the rotating shaft 143. That is, the driving pin portion 144 may be positioned away from a rotational center of the rotating shaft 143.

The compression mechanism may include a fixed scroll 150 fixed to an upper surface of the main frame 120, an orbiting scroll 160 placed on the upper surface of the main frame 120 and engaged with the fixed scroll 150, and an Oldham ring 170 disposed between the orbiting scroll 160 and the main frame 120 that prevents the rotation of the orbiting scroll 160. A fixed wrap 151 may be spirally wound and formed on the fixed scroll 150. Further, an orbiting wrap 161 may be spirally wound and formed on the orbiting scroll 160. The fixed wrap 151 together with the orbiting wrap 161 may form a compression chamber (P). A boss portion 162 may be formed to protrude at a bottom surface of the orbiting scroll 160, for example, a lateral surface opposite the orbiting wrap 161. The boss portion 162 may engage the rotating shaft 143 to receive a rotary force therefrom.

A sliding bush 163 may be combined with the driving pin portion 144 of the rotating shaft 143 to slide in a radial direction. The sliding bush 163 may be combined with the boss portion 162 of the orbiting scroll 160 to slide in a rotating direction. An external diameter of the sliding bush 163 may be formed to be same as an internal diameter of the boss portion 162 of the orbiting scroll 160, to thereby reduce friction between the rotating shaft 143 and the orbiting scroll 160. Further, a main frame bush 122 may be provided on an inside surface of the main frame 120 to reduce friction between the rotating shaft 143 and main frame 120. Oil may be supplied by an oil feeder 180 provided at a lower end portion of the rotating shaft 143 to lubricate each of the bushes 122, 163.

For example, the oil may be stored in a oil storage space formed by an inner surface of a base 112 of the container 110. The oil may be pumped from the oil storage space and supplied to the compression device through an oil flow path 143a formed inside the rotating shaft 143. The oil feeder 180, provided at a lower end portion of the oil flow path 143a, may rotate with the rotating shaft 143 to pump the oil from the oil storage space into the oil flow path 143a. The pumped oil may then be supplied to the compression device positioned at an upper portion of the oil flow path 143a.

To ensure that the oil is supplied to the oil feeder 180, oil should be maintained at an appropriate level. As discussed previously, the oil level may vary during operation of the compressor. The variation of oil level may be an absolute variation, which may be caused by a loss of oil, for example, by leakage of oil, or a temporary variation, which may be caused during operation of the compressor. For example, the oil level may temporarily increase or decrease during operation according to a change in an operational speed of the compressor. Accordingly, the oil level should be maintained at an appropriate level to account for both absolute and temporary variations to ensure normal operation of the compressor.

An oil level detecting device that detects the oil level in real time may include a detector 200, provided in the container 110, and a controller 250. The controller 250 may monitor the oil level using measurements obtained from the detector 200. The controller 250 may be provided on an outer wall of the container 110. Alternatively, the controller 250 may be provided at a remote location, for example, in a management facility or control room.

The detector 200 may include a pair of electrodes 210 that may protrude into the container 110. A supporting plate 220 may be provided to support the electrodes 210 and allow it to pass through the case 110 into the compressor. The supporting plate 220 may be inserted into a mounting hole 114 formed through the container 110 and may be attached thereto by, for example, welding or another appropriate method. The supporting plate 220 may be attached to the case 110 such that the supporting plate 220 is flush with an outer surface of the case 110. Further, the supporting plate 220 may include a flange 222 that protrudes from an outer circumference of the supporting plate 220. A flange seating portion 116 having a diameter greater than the mounting hole 114 may be formed at an outer circumference of the mounting hole 114. The flange 222 may then be seated on the flange seating portion 116 and may be, for example, welded to the case.

Referring to FIG. 2, the detector 200 may include a pair of electrode plates 210 disposed inside the container 110. The electrode plates 210 may extend into the oil storage space such that variation in oil levels may be detected by the electrode plates 210. The electrode plates 210 may be mounted to an interior side wall of the container by being connected to the supporting plate 220.

Each of the electrode plates 210 may include a conductive plate 212, which may be formed of a conductive material, and a pin 214, which may be formed to be integral with the conductive plate 212. As shown in FIG. 2, the pins 214 may have a width that is smaller than a width of the conductive plates 212. The pair of conductive plates 212 may be disposed to be adjacent to each other having a predescribed spacing therebetween. Thus, the pair of conductive plates 212 may serve as a capacitor having a capacitance that may vary according to variations in the oil level. For example, the capacitance between the electrode plates 210 may be a predetermined value when the oil level is below the electrode plates 210. As the oil level rises to contact the electrode plates 210, the presence of the oil may vary the capacitance of the electrode plates 210. Accordingly, each of the electrode plates 210 may be disposed at appropriate positions corresponding to an upper and lower limit of the oil level. The incremental changes in the capacitance may then be monitored to detect whether the oil level is outside an acceptable range.

Figure 3:
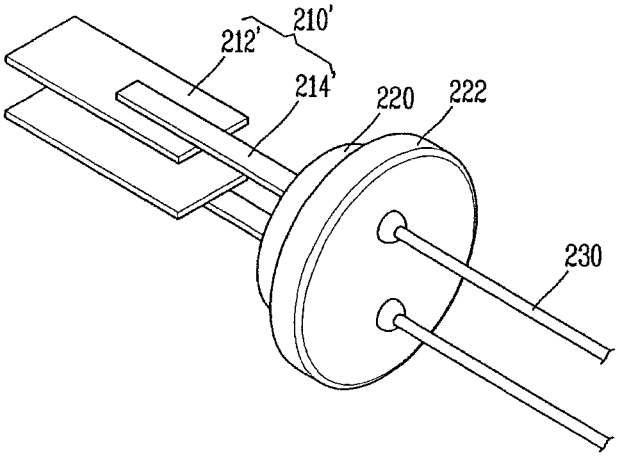
FIG. 3 is a perspective view of an oil level detecting device according to another embodiment.

Simply for ease of explanation, the conductive plate 212 and pin 214 of the electrode plate 210 have been described as being integrally formed. In another embodiment, as illustrated in FIG. 3, a conductive plate 212' and a pin 214' may be individually molded, then bonded to each other using a method, such as, for example welding, or another appropriate method. Moreover, the electrode plates 210 may be formed such that the conductive plate 212 and the pin 214 are the same width. In such a case, the conductive plate 212 and the pin 214 may be formed such that they are integrally formed as a single piece or as separate parts that are bonded together.

Figure 4:
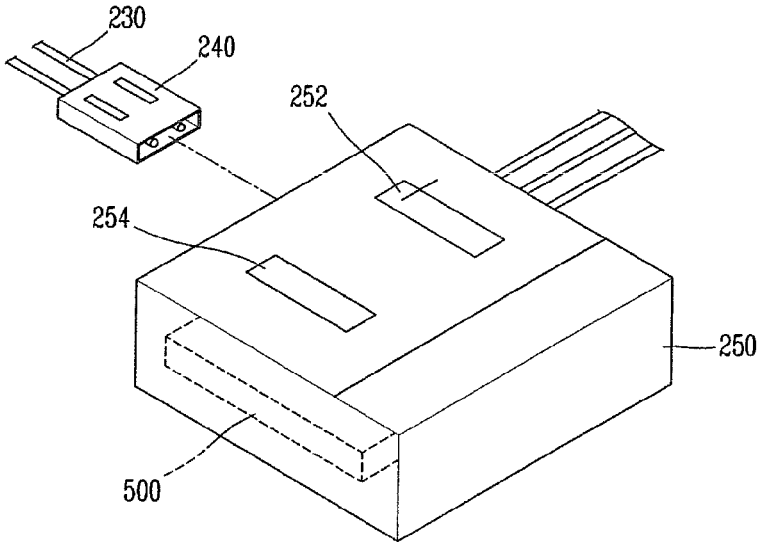
FIG. 4 is a perspective view of a controller including a signal processor according to an embodiment.

FIG. 4 is a perspective view of a controller including a signal processor to an embodiment. The controller 250 of FIG. 4 may be connected to the detector 200. The controller 250 may be electrically connected to the detector 200 by a connector 240. The connector 240 may be attached to lead wires 230, which may be connected to pins 214 of the detector 200. A printed circuit board including a signal processor may be provided in the controller 250. The controller 250 may also include two LEDs 252, 254 provided on an outer surface thereof.

The LEDs 252, 254 may serve as a display to visually display the detected oil level. More specifically, the LED 252 may indicate that the oil level is in a normal condition, and the LED 254 may indicate that the oil level is not in a normal condition. Each LED may have a different color, thereby allowing the user to easily recognize the oil level visually.

Figure 5:
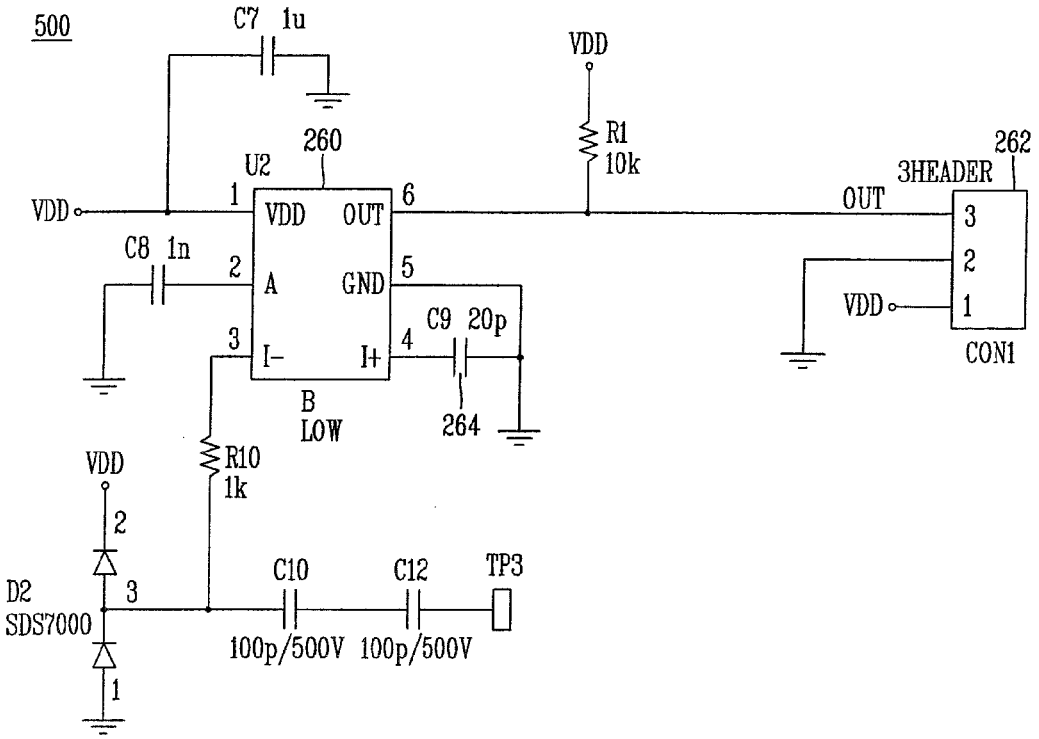
FIG. 5 is a circuit diagram of the signal processor of FIG. 4.

FIG. 5 is a circuit diagram of the signal processor of FIG. 4 according to an embodiment. The signal processor 500 of FIG. 5 may be provided in a printed circuit board. The signal processor 500 may include a microcomputer 260 connected to the detector 200 that receives a capacitance value from the detector 200 for comparison to a reference property of an electric element.

The microcomputer 260 may be provided with six terminals. DC voltage (VDD) may be applied to a first terminal, and a noise filter may be connected to a second terminal. Further, the detector 200 may be connected to a third terminal, and an electric element, for example, a reference capacitor 264 having a predetermined capacitance, may be connected to a fourth terminal. The capacitance of the reference capacitor 264 may be the same as the capacitance of the detecting portion 210 (electrode plates) of the detector 200 when the oil level is in a normal condition. The microcomputer 260 may check the oil level by using a measured capacitance of the detecting portion 210 as an input value, and using the capacitance of the reference capacitor 264 as a reference value for comparison to the measured value.

A fifth terminal of the microcomputer 260 may be grounded, and a sixth terminal may be an output terminal. The output terminal may be connected to a third terminal of a three-pin header 262 corresponding to an output terminal provided on the controller 250. A second terminal of the three-pin header 262 may be grounded, and the first terminal may be connected to a DC voltage (VDD). In addition, the three-pin header 262 may be connected to the controller 250 to provide information about the oil level.

The compressor as illustrated in FIG. 1 may be implemented in an air conditioning system having a plurality of compressors and indoor units. Examples of an air conditioner having a plurality of compressors and methods of controlling the same are disclosed in co-pending application Ser. No. 12/958,915, now abandoned, which is hereby incorporated by reference.

Figure 6:
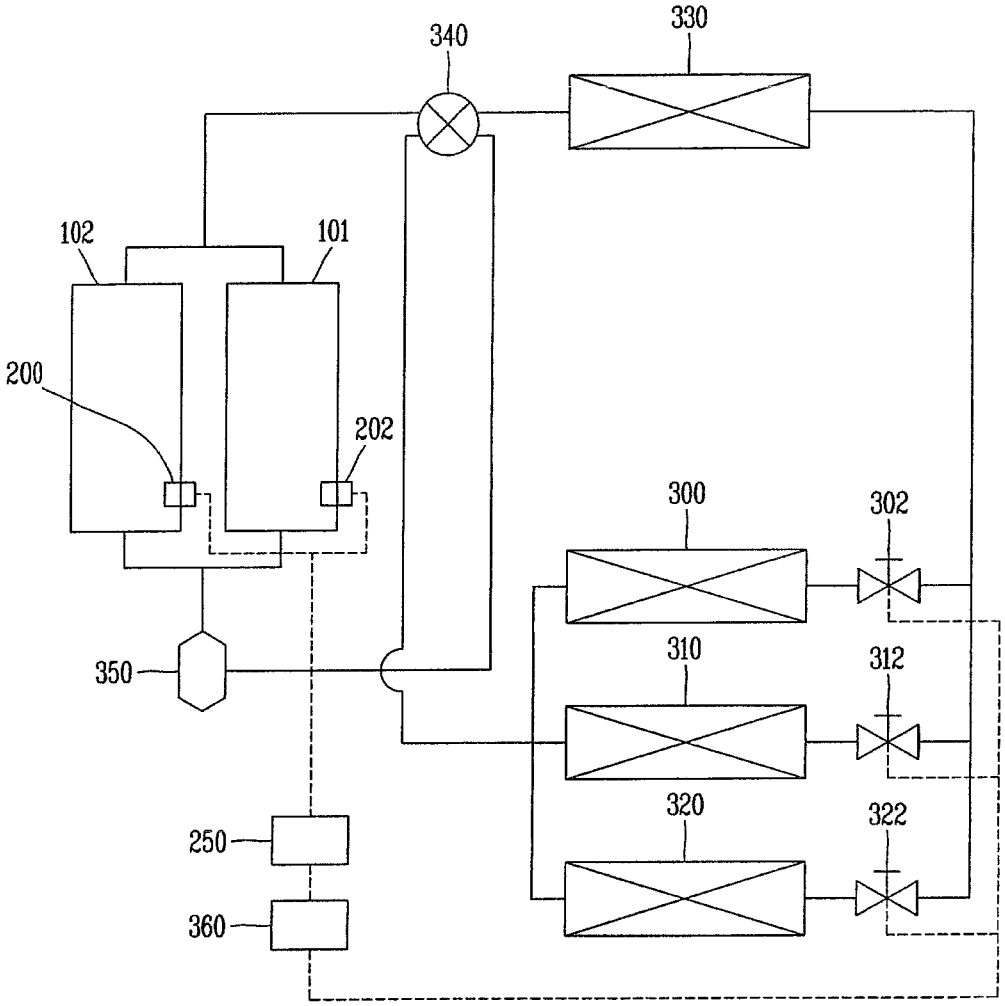
FIG. 6 is a block diagram of an air conditioning system according to an embodiment.

Referring to FIG. 6, the air conditioner may include two compressors 101, 102, three indoor heat exchangers 300, 310, 320, expansion valves 302, 312, 322 connected to the indoor heat exchangers, respectively, an outdoor heat exchanger 330, a 4-way valve 340, and an accumulator 350 that supplies refrigerant to each of the compressors 101, 102. Each of the compressors 101, 102 may be provided with the above discussed detector 200 and controller 250. An indoor unit in an air conditioning system may include an indoor heat exchanger and an expansion valve to control the flow rate of working fluid to the indoor heat exchanger. The controller 250 may transmit control signals to a system controller 360 that controls the operation of the air conditioner. Further, the system controller 360 may control various valves or fans in addition to the other elements of the air conditioning system as illustrated in FIG. 6.

Hereinafter an operation of the signal processor 500 will be described. If the oil level is in a normal condition or within an acceptable range, then the capacitance of the detector 200 may be similar to the capacitance of the reference capacitor 264. In this case, a voltage similar to the DC voltage (VDD) may be output through the sixth terminal, thus a voltage difference between the first and third terminals may become "0". On the contrary, if the oil level is not in a normal condition or is outside an acceptable range, then the capacitance of the detector 200 may have deviated from the reference capacitor 264. In this case, the voltage of the sixth terminal may become "0." Accordingly, a voltage difference between the first and third terminals of the three-pin header 262 may correspond to VDD. The voltage difference output from the three-pin header 262 may be transmitted to the system controller 360 as a control signal. The system controller 360 may control the operation of the compressor or the indoor unit according to the received control signal. If it is determined that oil is not at an appropriate level, the system controller 360 may adjust the oil level to maintain an appropriate condition. For example, if the oil level is determined to be below a normal range, the controller 360 may implement an oil collecting operation to adjust the oil level.

Simply for ease of explanation, the values for voltages output at the sixth terminal have been described as being VDD when the oil level is within an acceptable range, and "0" when the oil level is outside the acceptable range. However, the voltage output at the sixth terminal is not limited to the foregoing values and may be configured to have an opposite value. For example, when the oil level is in a normal condition, the output voltage may become "0", but otherwise it may become "VDD."

Further, a voltage in proportion to a difference between the capacitance of the reference capacitor 264 and the capacitance of the detector 200 may be output at the sixth terminal. For example, it may be possible not only to merely check whether the oil level is in a normal condition, but also to check an amount in which the oil level is outside a normal condition or range, thereby allowing a more precise control of the oil levels.

Moreover, the microcomputer 260 may monitor the oil level in real time while simplifying the configuration of the oil level detecting device. For example, complicated processes, such as converting a value measured from the detecting portion to compare the value with a reference value recorded in memory, and the like, may be eliminated.

In addition, a property of a detecting portion used to detect the oil level may not be necessarily limited to a capacitance as described above, but any property that varies with respect to the oil level may be used. For example, in another embodiment the detecting portion may be configured such that a resistance value may vary with respect to the oil level. In this embodiment, an electronic element having a reference resistance value may be provided in the signal processor to be compared to a measured resistance value of the detecting portion.

In another embodiment, a plurality of electronic elements may be provided in the signal processor. In this embodiment, each of the plurality of electronic elements may be configured to correspond to a different oil level. Thus, a greater predetermined range of oil levels may be monitored.

According to an embodiment, there is provided an oil level detecting unit, which may be provided in a compressor including a compression unit that introduces and compresses a working fluid, a driving unit mechanically connected to the compression unit that operates the compression unit, and a case that accommodates the compression unit and driving unit thereinside and having an oil storage space to store oil at a lower portion thereof. The oil level detecting unit may include a detector including a supporting portion welded to the case and a detecting portion disposed to be protruded inside the case in which the property thereof varies according to the oil level, and a signal processor comprising an electronic element having a reference property that compares the property of the detecting portion with the reference property of the electronic element and output a control signal according to the result.

According to this embodiment, an oil level is not determined by converting a value measured by the detecting portion and comparing the value with a numerical value recorded in the storage means, such as a memory, but rather, the detecting portion may be configured to have a property that varies according to the oil level, and the signal processor may include an electronic element having the property corresponding to the property of the detecting portion when the oil level inside the case is at a specific level, for example, at a desirable level, and thus, the two properties, the property of the detecting portion and the property of the electronic element, may be directly compared to each other without having an additional conversion process, thereby simplifying the configuration of a signal processor.

Further, a plurality of electronic elements may be provided therein, and the property of each electronic element may correspond to a specific oil level inside the compressor. Accordingly, it may be possible to check whether the oil level is positioned within a specific range.

Moreover, the property may be an arbitrary value that an electronic element may have, or the property may be any physical property, such as a resistance or capacitance. In one embodiment, the detecting portion may have a capacitance that varies according to the oil level, and the electronic element may be a capacitor having a capacitance corresponding to a reference value. On the other hand, the detecting portion may include a pair of electrode plates that extends to an inside of the oil storage space, and in this case, a capacitance of the detecting portion may be changed according to the amount of oil existing between the electrode plates. In addition, the oil level detecting unit may further include a display operated by a control signal of the signal processor to visually or acoustically indicate the oil level.

Further, the supporting portion may include a supporting plate welded inside a mounting hole formed at a wall surface of the case, and the detecting portion may include a pair of electrode plates connected to the supporting plate. A flange may be formed at an outer circumference of the supporting portion, and a flange seating portion, on which the flange may be contacted, may be formed at an outer circumference of the mounting hole. In other words, the flange may be seated on a flange seating portion positioned at an outer circumference of the mounting hole to be maintained at the desired position, thereby facilitating the mounting process. The supporting plate may be made of a metallic material, and the supporting plate and the electrode may be combined with each other by interposing an insulation material therebetween.

The electrode plate may include a conductive plate positioned at an inside of the oil storage space and a pin that extends from the conductive plate by penetrating the supporting portion. Further, the display may include a light emitter that emits different colors according to a control signal output from the signal processor.

According to another embodiment, there is provided an air conditioner, including one or more compressors that may include a compression unit that introduces and compresses a working fluid, a driving unit mechanically connected to the compression unit that operates the compression unit, a case that accommodates the compression unit and driving unit thereinside and having an oil storage space to store oil at a lower portion thereof, and an oil level detecting unit fixed to the case; an indoor unit that performs cooling or heating using refrigerant discharged from the compressor; and a controller that controls the operation of the compressor and the indoor unit. The detector oil level detecting unit may include a detector including a supporting portion welded to the case and a detecting portion disposed to protrude inside the case in which the property thereof varies according to the oil level; and a signal processor including an electronic element having a reference property, that compares the property of the detecting portion with the reference property of the electronic element and outputs a control signal according to the result. The controller may control the operation of the compressor or the indoor unit according to a control signal transmitted from the signal processor, to control the oil level to be in an appropriate condition. The indoor unit may be defined to have a indoor heat exchanger and an expansion valve.

According to this embodiment, the oil level may be checked in real time by comparing the property of the detecting portion with the property of the electronic element as a reference value, and thus, the configuration of the signal processor may be simplified, thereby reducing the unit cost of the product, as well as enhancing reliability.

According to another embodiment, an oil level detecting device may be provided in a compressor. The compressor may include a compression device that introduces and compresses a working fluid, a drive device mechanically connected to the compression device that operates the compression device, and a case that accommodates the compression device and the driving device thereinside and having an oil storage space that stores oil at a lower portion thereof. The oil level detecting device may include a detector including a supporting portion configured to be attached to the case of the compressor and a detecting portion that protrudes inside the case, wherein at least one property of the detecting portion may vary according to an oil level inside the case, and a signal processor including an electronic element having at least one reference property, that compares the at least one property of the detecting portion with the at least one reference property of the electronic element and outputs a control signal according to the result.

The supporting portion may be welded to the case of the compressor. Further, a surface of the supporting portion may be flush with an outer surface of the case. Furthermore, the at least one property of the detecting portion may be a capacitance of the detecting portion, which may vary according to the oil level, and the electronic element may be a capacitor and the at least one reference property may include a predetermined capacitance of the electronic element. The predetermined capacitance of the capacitor may be the same as the capacitance of the detecting portion when the oil level inside the case is in an appropriate condition. Alternatively, when the oil level inside the case is in an appropriate condition, the capacitance of the detecting portion may be within a predetermined range of the predetermined capacitance of the capacitor.

The detecting portion may include a pair of electrode plates that extends into an inside of the oil storage space. Further, the pair of electrode plates may extend perpendicular to an inner wall of the case.

The oil level detecting device of this embodiment may further include a display operated by a control signal of the signal processor that visually or acoustically displays the oil level. The display may include a light emitter that emits different colors according to a control signal output from the signal processor.

The supporting portion may include a supporting plate welded inside a mounting hole formed at a wall surface of the case, and the detecting portion may include a pair of electrode plates connected to the supporting plate. A flange may be formed at an outer circumference of the supporting portion, and a flange seating portion, on which the flange may be positioned, may be formed at an outer circumference of the mounting hole. Each of the plurality of electrode plates may include a conductive plate positioned at an inside of the oil storage space, and a pin that extends from the conductive plate to the supporting portion. The pins of the plurality of electrode plates may extend perpendicular to a wall surface of the case. Further, the conductive plates of the plurality of electrode plates may extend perpendicular to a wall surface of the case. The pin may be formed integral with the conductive plate, and the conductive plate may be formed wider than the pin.

According to another embodiment, an air conditioner may be provided which may include a plurality of compressors including a compression device that introduces and compresses a working fluid, a driving device mechanically connected to the compression device that operates the compression device, a case that accommodates the compression device and the driving device thereinside and having an oil storage space that stores oil at a lower portion thereof, and an oil level detecting device fixed to the case; an indoor device that performs cooling or heating using refrigerant discharged from the plurality of compressors, the indoor device comprising an indoor heat exchanger and an expansion valve; and a controller that controls an operation of the plurality of compressors or the indoor device. The oil level detecting device may include a detector including a supporting portion configured to be attached to the case and a detecting portion that protrudes inside the case, wherein at least one property of the detecting portion may vary according to an oil level within the case; and a signal processor including an electronic element having at least one reference property, the signal processor comparing the at least one property of the detecting portion with the at least one reference property of the electronic element and outputting a control signal according to the result. The controller may control the operation of the plurality of compressors or the indoor device according to the control signal transmitted from the signal processor to control the oil level inside the case to be in an appropriate condition.

Any reference in this specification to "one embodiment," "an embodiment," "example embodiment," etc., means particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An oil level detecting device provided in a compressor, the compressor comprising a compression device that introduces and compresses a working fluid, a drive device mechanically connected to the compression device that operates the compression device, and a case that accommodates the compression device and the driving device thereinside and having an oil storage space that stores oil at a lower portion thereof, the oil level detecting device comprising:

a detector comprising a supporting portion configured to be attached to the case of the compressor and a detecting portion that protrudes inside the case, wherein at least one property of the detecting portion varies according to an oil level inside the case; and a signal processor comprising an electronic element having at least one reference property, that compares the at least one property of the detecting portion with the at least one reference property of the electronic element and outputs a control signal according to the result, wherein the supporting portion comprises a supporting plate installed inside a mounting hole formed at a wall surface of the case, and the detecting portion comprises a pair of electrode plates connected to the supporting plate, and wherein each of the plurality of electrode plates comprises:

a conductive plate positioned at an inside of the oil storage space; and a pin that extends from the conductive plate to the supporting portion so as to electrically connect the conductive plate to the signal processor through the supporting plate, the pin being formed as a rigid body so as to support the conductive plate respective to the supporting plate.

2. The oil level detecting device of claim 1, wherein the supporting portion is welded to the case of the compressor.

3. The oil level detecting device of claim 1, wherein a surface of the supporting portion is flush with an outer surface of the case.

4. The oil level detecting device of claim 1, wherein the at least one property of the detecting portion comprises a capacitance of the detecting portion which varies according to the oil level, and wherein the electronic element is a capacitor and the at least one reference property comprises a predetermined capacitance of the electronic element.

5. The oil level detecting device of claim 4, wherein the predetermined capacitance of the capacitor is the same as the capacitance of the detecting portion when the oil level inside the case is in an appropriate condition.

6. The oil level detecting device of claim 4, wherein when the oil level inside the case is in an appropriate condition the capacitance of the detecting portion is within a predetermined range of the predetermined capacitance of the capacitor.

7. The oil level detecting device of claim 4, wherein the detecting portion comprises a pair of electrode plates that extends into an inside of the oil storage space.

8. The oil level detecting device of claim 7, wherein the pair of electrode plates extends perpendicular to an inner wall of the case.

9. The oil level detecting device of claim 1, further comprising:

a display operated by a control signal of the signal processor that visually or acoustically displays the oil level.

10. The oil level detecting device of claim 9, wherein the display comprises a light emitter that emits different colors according to a control signal output from the signal processor.

11. The oil level detecting device of claim 1, wherein a flange is formed at an outer circumference of the supporting portion, and wherein a flange seating portion, on which the flange is positioned, is formed at an outer circumference of the mounting hole.

12. The oil level detecting device of claim 1, wherein the pins of the plurality of electrode plates extend perpendicular to a wall surface of the case.

13. The oil level detecting device of claim 12, wherein the conductive plates of the plurality of electrode plates extend perpendicular to a wall surface of the case.

14. The oil level detecting device of claim 1, wherein the pin is formed integral with the conductive plate.

15. The oil level detecting device of claim 1, wherein the conductive plate is formed wider than the pin.

16. A compressor comprising the oil level detecting device of claim 1.

17. An air conditioner comprising the compressor of claim 16.

18. The oil level detecting device of claim 1, wherein the conductive plates are spaced a prescribed distance from the wall surface of the case.

19. The oil level detecting device of claim 1, wherein a width of the conductive plates is less than a width of the conductive plates and the mounting hole formed at the wall surface of the case.

20. The oil level detecting device of claim 1, further comprises a microcomputer, wherein the microcomputer comprises:

an input terminal electronically connected to the electronic element for input of the at least one reference property;

other input terminal electronically connected to the detecting portion for input of the at least one property of the detecting portion; and an output terminal that compares the at least one property of the detecting portion with the at least one reference property of the electronic element and transfers a control signal to the controller.

21. An air conditioner, comprising:

a plurality of compressors comprising a compression device that introduces and compresses a working fluid, a driving device mechanically connected to the compression device that operates the compression device, a case that accommodates the compression device and the driving device thereinside and having an oil storage space that stores oil at a lower portion thereof, and an oil level detecting device fixed to the case;

an indoor device that performs cooling or heating using refrigerant discharged from the plurality of compressors, the indoor device comprising an indoor heat exchanger and an expansion valve; and a controller that controls an operation of the plurality of compressors or the indoor device, wherein the oil level detecting device comprises:

a detector comprising a supporting portion configured to be attached to the case and a detecting portion that protrudes inside the case, wherein at least one property of the detecting portion varies according to an oil level within the case; and a signal processor comprising an electronic element having at least one reference property, the signal processor comparing the at least one property of the detecting portion with the at least one reference property of the electronic element and outputting a control signal according to the result, wherein the controller controls the operation of the plurality of compressors or the indoor device according to the control signal transmitted from the signal processor to control the oil level inside the case to be in an appropriate condition, wherein the supporting portion comprises a supporting plate installed inside a mounting hole formed at a wall surface of the case, and the detecting portion comprises a pair of electrode plates connected to the supporting plate, and wherein each of the plurality of electrode plates comprises:

a conductive plate positioned at an inside of the oil storage space; and a pin that extends from the conductive plate to the supporting portion so as to electrically connect the conductive plate to the signal processor through the supporting plate, the pin being formed as a rigid body, formed integral with the conductive plate, so as to support the conductive plate respective to the supporting plate.

22. An oil level detecting device provided in a compressor, the compressor comprising a compression device that introduces and compresses a working fluid, a drive device mechanically connected to the compression device that operates the compression device, and a case that accommodates the compression device and the driving device thereinside and having an oil storage space that stores oil at a lower portion thereof, the oil level detecting device comprising:

a detector comprising a supporting portion configured to be attached to the case of the compressor and a detecting portion that protrudes inside the case, wherein at least one property of the detecting portion varies according to an oil level inside the case; and a signal processor comprising an electronic element having at least one reference property, that compares the at least one property of the detecting portion with the at least one reference property of the electronic element and outputs a control signal according to the result, wherein the supporting portion comprises a supporting plate installed inside a mounting hole formed at a wall surface of the case, and the detecting portion comprises a pair of electrode plates connected to the supporting plate, and wherein each of the pair of electrode plates comprises:

a conductive plate positioned at an inside of the oil storage space; and a pin that extends from the conductive plate to the supporting portion so as to electrically connect the conductive plate to the signal processor through the supporting plate, the pair of conductive plate being disposed to be adjacent to each other having a predescribed spacing therebetween.

*23. An oil level detector for detecting oil stored in an oil storage space in a case comprising:*

*a detector having a support configured to be attached to the case of the compressor and a pair of electrode plates configured to protrude into the case, wherein at least one property of the pair of electrodes varies according to an oil level inside the case; and*

*a signal processor configured to compare the at least one property of the pair of electrodes with at least one reference property and configured output a control signal according to the result,*

*wherein the support includes a support plate configured to be installed in a mounting hole formed at a wall surface of the case, and the pair of electrode plates are connected to the support plate, and each of the pair of electrode plates includes*

*(i) a conductive plate positioned inside the oil storage space; and*

*(ii) a pin extending from the conductive plate to the support to electrically connect the conductive plate to the signal*

*processor, the pin being formed as a rigid body so as to support the conductive plate to the supporting plate.*

*24. The oil level detector of claim 23, wherein the at least one property of the detector corresponds to a capacitance of the detector which varies according to the oil level, and at least one reference property comprises a predetermined capacitance.*

*25. The oil level detector of claim 23, wherein a flange is formed at an outer circumference of the support, and the mounting hole having a ledge to allow seating of flange on the ledge of the mounting hole.*

*26. The oil level detector of claim 23, wherein the pin and the conductive plate are connected to each other by welding.*

*27. The oil level detector of claim 23, wherein the conductive plate is formed wider than the pin.*

*28. The oil level detector of claim 27, wherein larger surfaces of the conductive plates face each other.*

*29. The oil level detecting device of claim 23, wherein the pair of electrode plates are spaced a prescribed distance from each other.*

*30. An oil level detector for detecting oil stored in an oil storage space of a case comprising:*

*a detector having a support configured to be attached to the case and a pair of electrodes configured to protrude inside the case, wherein at least one property of the detector varies according to an oil level inside the case; and*

*a signal processor configured to compare the at least one property of the detector with at least one reference property and configured output a control signal according to the result,*

*wherein the support includes a support plate installed in a mounting hole formed at a wall surface of the case, and the pair of electrode plates are connected to the support plate, and each of pair of electrode plates includes*

*(i) a conductive plate positioned at an inside of the oil storage space; and*

*(ii) a pin extending from the conductive plate to the support so as to support the conductive plate to the support plate, the pin is coupled to an outer surface of the conductive plate such that a first distance between the pair of conductive plates is less than a second distance between the pair of pins.*

*31. The oil level detector of claim 30, wherein the pin and the conductive plate are connected to each other by welding.*

*32. The oil level detector of claim 30, wherein a width of the conductive plate is greater than a width of the pin.*

*33. The oil level detector of claim 30, wherein larger surfaces of the conductive plates face each other.*

*34. An oil level detector for detecting oil stored in an oil storage space of a case comprising:*

*a detector having a support configured to be attached to the case and a pair of electrodes protruding inside the case, wherein at least one property of the detector varies according to an oil level inside the case; and*

*a signal processor configured to compare the at least one property of the detecting portion with at least one reference property and configured output a control signal according to the result,*

*wherein the support includes a support plate installed in a mounting hole formed at a wall surface of the case, the pair of electrode plates are connected to the support plate, and at least one of the pair of electrode plates includes*

*(i) a conductive plate positioned inside the oil storage space; and*

*(ii) a pin extending from the conductive plate to the support to electrically connect the conductive plate to the signal processor, the pin being formed as a rigid body so as to support the conductive plate to the support plate, and the pin and the conductive plate are separate components which are connected to each other.*

* * * * *